April 8, 1924.
L. G. GRAY
1,489,595
SLIDABLE COVER FOR ICE CREAM CABINETS
Filed May 25, 1920
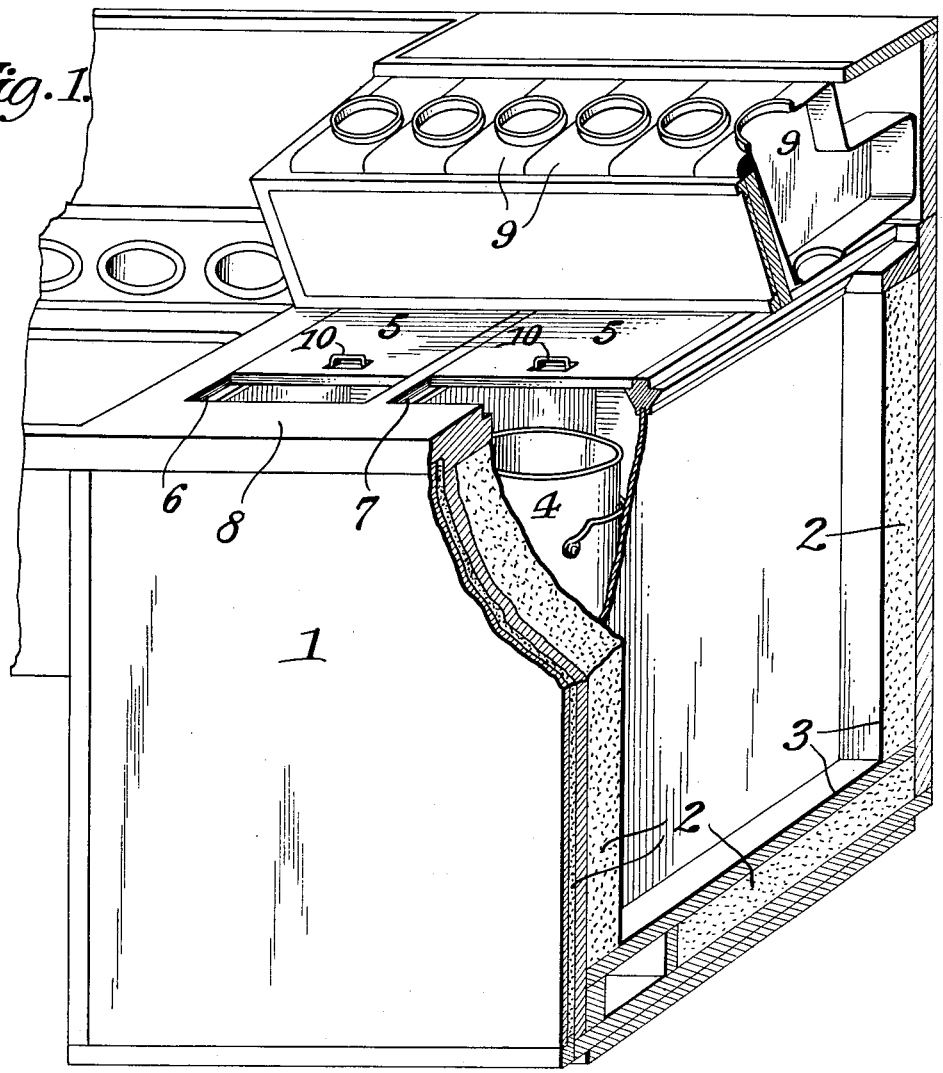
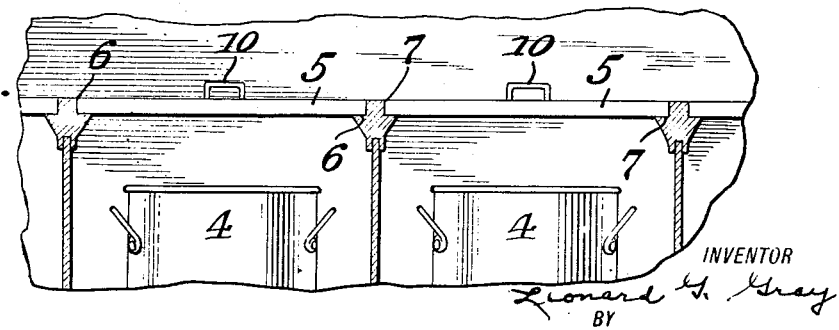
INVENTOR
Leonard G. Gray
BY
Dodson + Rae ATTORNEYS Patented Apr. 8, 1924.

1,489,595

UNITED STATES PATENT OFFICE.

LEONARD G. GRAY, OF DECATUR, ILLINOIS, ASSIGNOR TO WALRUS MANUFACTURING COMPANY, OF DECATUR, ILLINOIS, A CORPORATION OF ILLINOIS.

SLIDABLE COVER FOR ICE-CREAM CABINETS.

Application filed May 25, 1920. Serial No. 384,223.

*To all whom it may concern:*

Be it known that I, LEONARD G. GRAY, a citizen of the United States, residing at Decatur, in the county of Macon and State of Illinois, have invented a certain new and useful Improvement in Slidable Covers for Ice-Cream Cabinets, of which the following is a specification.

My invention is designed for use in connection with those ice cream cabinets which are used with soda fountains. Devices of this kind with which I am familiar, are usually provided with lids which have to be lifted out of place and set down on the work-board in order to permit the operator to obtain access to the ice cream receptacles.

This is objectionable from a number of viewpoints. First, because it necessitates the operator remembering to put the lid back in place or else it lays on the work table. It is well known that devices of this character are obliged to meet a very heavy demand to be supplied in a comparatively short time.

Therefore, anything that will operate to expedite the serving by the operator which will lessen his work and provide more convenient facilities for doing his work, is very desirable.

Other devices with which I am familiar are provided with hinged lids, which are very objectionable for the reason that by the continual rapid opening and closing by the operator of the lids, they become in a comparatively short time, broken off at the hinges.

My invention has for its object to provide a slidable lid which does not have to be removed at all in order to gain access to the ice cream receptacles, and which, when the latter is uncovered, not only does not clutter up the work table, but really affords a place upon which the glasses may be placed.

My means of accomplishing the foregoing objects may be more readily understood by having reference to the accompanying drawings which are hereby annexed and are a part of this specification in which:

Figure 1 is a perspective view of an ice cream cabinet equipped with my improvement.

Fig. 2 is an enlarged cross-section of the top of the cabinet.

Similar reference numerals refer to similar parts throughout the entire description.

As shown in the drawings, 1 is the ice cream cabinet, the walls of which are provided with the usual insulation 2 and a metal lining 3. The ice cream receptacles 4 are located in various compartments inside of the cabinet 1. A portion of the exterior of the cabinet is broken away to show the location of one of these receptacles 4. My improved lid 5 as shown in the drawing, comprises a plate, preferably made of white glass, although it may be a combination of metal with a white celluloid top, or it may be of metal or any other suitable material, such as fibre, marble, wood, tile, etc. These lids 5 slide in rabbets or recesses 6 and 7 provided in cross members or ribs the top 8 of the cabinet 1. The syrup jars 9 are made long and shallow as clearly seen in the drawings, in order that the lids may slide underneath the syrup jars 9, thus permitting the packing of the ice around the ice cream receptacles without difficulty. Metal handles 10 are suitably attached to the lids for moving them backward and forward. The recesses 6 and 7 are preferably provided with straight sides so that the lids can be removed for cleaning. The operation of my improvement is as follows:

When the operator desires to secure access to the ice cream receptacle 4, by means of the lid 5, he pushes the lid 5 back until he can gain access to the interior of the receptacle 4. There is then room to set the glasses on the lid 5 if desired. At the same time, if he has the ice cream disher in one hand and his glasses in the other, he can push the lid back with the glasses or the disher and continue the act of serving the ice cream, whereas with the old way, he would have to set down the glasses, lift off the lid, take out the ice cream, set down the glasses again and replace it in position.

It will be apparent from the foregoing, that by use of my improvement, I am able to eliminate a number of motions and thus greatly expedite the work of the dispenser. Practice has shown that a fountain thus equipped, will serve a considerable number of more persons per hour than can be done with the old construction.

Having described my invention, what I regard as new and desire to secure by Letters Patent of the United States is:

1. In a soda fountain and ice cream cabinet having a plurality of syrup jars above and to the rear of the ice cream cabinet, a plurality of rabbeted cross members at the top of said cabinet, a plurality of plates slidably fitted to said cross members, there being a space beneath the said syrup jars into which said plates may be moved, for the purpose set forth substantially as described.

2. In a soda fountain, an ice cream cabinet, a plurality of syrup jars above and to the rear of the cabinet, a plurality of openings in said cabinet, a recess extending along each side of said openings, lids mounted in said openings which slide rearwardly beneath the syrup jars.

In testimony whereof I have signed the foregoing specification.

LEONARD G. GRAY.